United States Patent
Kinpara et al.

(10) Patent No.: US 8,446,063 B2
(45) Date of Patent: May 21, 2013

(54) STEPPING MOTOR

(75) Inventors: Shuhei Kinpara, Kitasaku-gun (JP);
Yuzuru Suzuki, Kitasaku-gun (JP);
Seiya Fujimoto, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 127 days.

(21) Appl. No.: 13/089,818

(22) Filed: Apr. 19, 2011

(65) Prior Publication Data
US 2011/0285217 A1 Nov. 24, 2011

(30) Foreign Application Priority Data

May 19, 2010 (JP) .................................. 2010-115115

(51) Int. Cl.
*H02K 37/00* (2006.01)

(52) U.S. Cl.
USPC ...................... 310/257; 310/49.09; 310/49.15; 310/49.16

(58) Field of Classification Search
USPC ............. 310/257, 49.09, 49.11, 49.15, 49.16, 310/49.17, 49.23, 49.34
See application file for complete search history.

(56) References Cited

U.S. PATENT DOCUMENTS

| | | | | |
|---|---|---|---|---|
| 4,207,483 A | * | 6/1980 | Baer | 310/49.07 |
| 4,333,026 A | * | 6/1982 | Bock et al. | 310/49.18 |
| 4,355,248 A | * | 10/1982 | Manson | 310/216.132 |
| 4,942,325 A | * | 7/1990 | Fukaya | 310/257 |
| 5,291,084 A | * | 3/1994 | Shiotsuki et al. | 310/49.16 |
| 7,977,828 B2 | * | 7/2011 | Fukuzawa | 310/49.16 |

FOREIGN PATENT DOCUMENTS

| | | |
|---|---|---|
| JP | A-2002-112522 | 4/2002 |
| JP | A-2007-143253 | 6/2007 |

* cited by examiner

*Primary Examiner* — Dang Le

(74) *Attorney, Agent, or Firm* — Oliff & Berridge, PLC

(57) ABSTRACT

A claw-pole-type stepping motor includes a stator annularly disposed therein and having a coil, a rotor rotatably disposed inside the stator and having a multiply magnetized permanent magnet and a shaft, an outer yoke provided in the stator and having a cup shape opening toward an axially outside direction an outer circumferential portion provided in the outer yoke and having a cylindrical shape and an inner circumferential portion including first pole teeth, an inner yoke provided in the stator and having second pole teeth provided in an inner circumference thereof and an outer circumferential portion fixed to an inner circumferential surface of the outer circumferential portion of the outer yoke, in which the first pole teeth and the second pole teeth are engaging with each other via a gap in an axial direction and are disposed with respect to the permanent magnet of the rotor via a gap, a fixed portion of the inner yoke and the outer yoke is positioned at the axial inside of an opening end of the cup shape of the outer yoke and the opening end protrudes beyond the fixed portion toward the axially outer direction.

3 Claims, 5 Drawing Sheets

Fitting Ratio 100%

Fitting Ratio 75%

Fitting Ratio 50%

Fitting Ratio 25%

Fitting Ratio 0%

$(A-a)/t = 0\%$ $(A-a)/t = 25\%$ $(A-a)/t = 50\%$ $(A-a)/t = 75\%$ $(A-a)/t = 100\%$

STEPPING MOTOR

BACKGROUND OF THE INVENTION

1. Field of the Invention

The present invention relates to a structure of a stator yoke of a stepping motor.

2. Related Art

In a claw-pole-type stepping motor, when an outer yoke is fixed to an inner yoke, a method such as press fitting, caulking, bonding and welding between an inside of the cup-shaped outer yoke and an outer circumferential portion of the inner yoke contacting the inside of the outer yoke, is used. However, the outer and inner yokes are produced by press working, so that a round portion is formed by bending at a cup-shaped opening side end portion which is a fixing portion for the outer yoke and a material flow is formed by punching at the outer circumference that is a fixing portion for the inner yoke. In this condition, when the fixing portions of the inner and outer yokes are contacted on the same plane, the contacting area is uneven according to conditions of the round portions caused by bending and material flow caused by punching. As a result, characteristics of the motors are not uniform.

As a solution to these problems, Japanese Patent Application, First Publication No. 2002-112522 discloses a technique described below. In this technique, a yoke is fixed by laser welding in addition to press fitting and bonding, and therefore leakage of a magnetic flux and destabilization of a magnetic circuit, which are caused by differences in strength of the fixing portion, are avoided, and unevenness in qualities of motors can be inhibited. Japanese Patent Application, First Publication No. 2007-143253 discloses a structure in which, focusing on a specific shape of a yoke, magnetic resistance is reduced by providing a reinforcing plate to a magnetic circuit for an enlargement of the magnetic circuit and characteristics of a motor can be improved.

SUMMARY OF THE INVENTION

As a method for improvement in the lack of consistency in characteristics of a stepping motor, the welding disclosed in Japanese Patent Application, First Publication No. 2002-112522, and the additional reinforcing board to a magnetic circuit which is disclosed in Japanese Patent Application, First Publication No. 2007-143253, may be used. However, the welding increases the number of working steps, so that producing cost cannot be reduced in the welding. Furthermore, the additional reinforcing board to the magnetic circuit in Japanese Patent Application, First Publication No. 2007-143253 increases the number of parts, so that cost-cutting and reductions in size are prevented. In such circumstances, an object of the present invention is to provide a stepping motor in which a contacting condition of fixing portions of an outer and an inner yokes can be improved without increase in number of working steps and number of parts, and lack of consistency of characteristics of the motor can be inhibited.

According to a first aspect of the present invention, a claw-pole-type stepping motor includes a stator annularly disposed therein and having a coil, a rotor rotatably disposed at an inside position of an inner circumference of the stator and having a multiply magnetized permanent magnet and a shaft, an outer yoke provided in the stator and having a cup shape opening toward an axially outside direction, an outer circumferential portion provided in the outer yoke and having a cylindrical shape and an inner circumferential portion including first pole teeth, an inner yoke provided in the stator and having second pole teeth provided in an inner circumference thereof and an outer circumferential portion fixed to an inner circumferential surface of the outer circumferential portion of the outer yoke, in which the first pole teeth and the second pole teeth are engaging with each other via a gap in an axial direction and are disposed with respect to the permanent magnet of the rotor via a gap, fixed portion of the inner yoke and the outer yoke is positioned at the axial inside of an opening end of the cup shape of the outer yoke and the opening end protrudes beyond the fixed portion toward the axially outer direction.

According to the first aspect of the present invention, the fixed portion of the inner and the outer yoke is positioned at the axial inside maintaining a distance from an opening end of the cup shape of the outer yoke. Therefore, a phenomenon in which the opening end of the cup shape of the outer yoke affects a magnetic circuit in the yoke can be avoided.

According to a second aspect of the present invention, in the first aspect, a round portion is formed at an inner side of the opening end of the cup shape and the fixed portion is positioned at a position including the portion except for the round portion. The structure in detail of the round portion formed at the inner side of the opening end portion of the cup shape of the outer yoke has an unevenness caused by press working. Therefore, the fixed portion of the outer and the inner yokes is positioned at the position including the portion except for the round portion, so that effect of the unevenness of the condition of the round portion with respect to the fixing condition can be inhibited.

According to a third aspect of the present invention, in the second aspect, the fixed portion is positioned at the position avoiding the round portion. According to the third aspect of the present invention, the inner yoke is fixed with respect to the outer yoke at the position except for the round portion, so that the effect of the unevenness of the condition of the round portion with respect to the fixing condition between the outer and the inner yokes can be avoided.

According to a fourth aspect of the present invention, in the third aspect, when the axial length of the round portion initiated from the opening end of the cup shape is defined as "a", an axial length from the opening end portion of the cup shape to the fixed position is defined as "A", the reference symbols "a" and "A" satisfy A≧a. According to the fourth aspect of the present invention, the fixed portion of the inner yoke and the outer yoke is positioned at the position except for the round portion. The contacting portion between both inner and outer yokes function as a magnetic circuit, so that unevenness of the contact area is caused in a case in which the fixed portion of both inner and outer yokes is positioned at a position including the round portion, whereby unevenness of the shape of the round portion leads to unevenness of a performance of the motor. According to the fourth aspect of the present invention, the position of the portion of the outer yoke to which the inner portion contacts avoids the round portion, so that development of these problems can be inhibited.

According to the first aspect of the present invention, a stepping motor, in which the contacting condition between the outer and the inner yokes can be improved without increase in working steps and number of parts and unevenness of characteristics of the motor can be inhibited, can be provided.

According to the second aspect or the third aspect of the present invention, unevenness of characteristics of the motors, which is caused by the unevenness of the shape of the round portion formed at the edge of the opening portion of the outer yoke, can be inhibited According to the fourth aspect of the present invention, unevenness of the characteristics of the motors can be slightly.

BRIEF DESCRIPTION OF DRAWINGS

FIG. 5A is a cross-sectional view showing the structure when the value on the horizontal axis in FIG. 4 is 100%, FIG. 5B is a cross-sectional view showing the structure when the value on the horizontal axis therein is 75%, FIG. 5C is a cross-sectional view showing the structure when the value on the horizontal axis therein is 50%, FIG. 5D is a cross-sectional view showing the structure when the value on the horizontal axis therein is 25%, and FIG. 5E is a cross-sectional view showing the structure when the value on the horizontal axis therein is zero %.

FIG. 7A is a cross-sectional view showing the structure when the value on the horizontal axis in FIG. 6 is zero %, FIG. 7B is a cross-sectional view showing the structure when the value on the horizontal axis therein is 25%, FIG. 7C is a cross-sectional view showing the structure when the value on the horizontal axis therein is 50%, FIG. 7D is a cross-sectional view showing the structure when the value on the horizontal axis therein is 75%, and FIG. 7E is a cross-sectional view showing the structure when the value on the horizontal axis therein is 100%.

DESCRIPTION OF THE PREFERRED EMBODIMENTS

Figure 1:
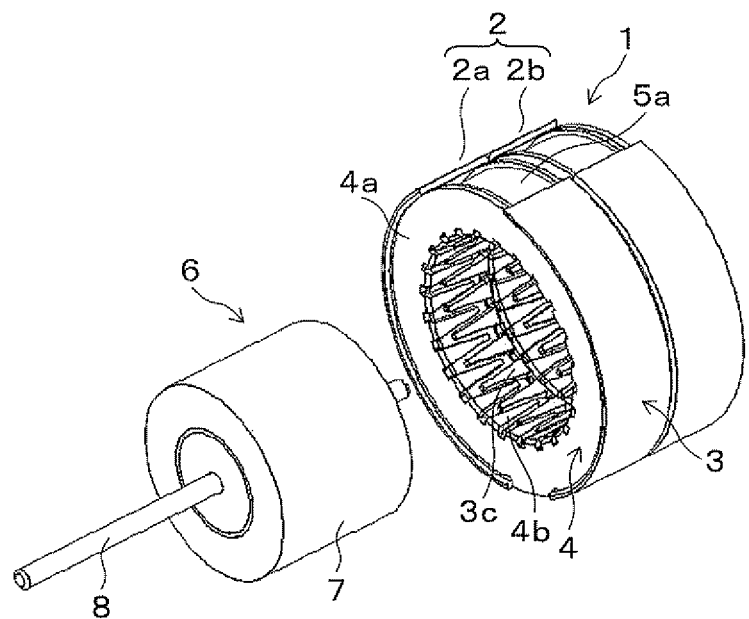
FIG. 1 is an exploded schematic view showing a stepping motor in accordance with an embodiment of the present invention.
Figure 2:
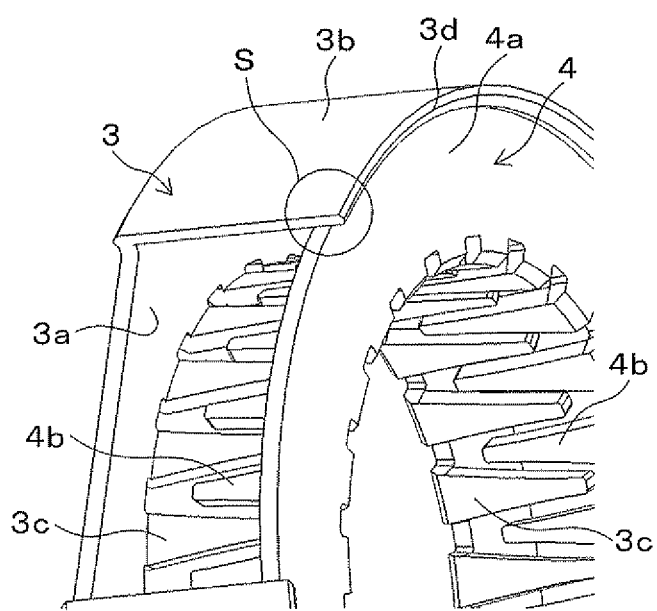
FIG. 2 is a partially enlarged view showing the stepping motor in accordance with the embodiment of the present invention.

A claw-pole-type stepping motor 1 according to an embodiment is shown in FIG. 1. A partially enlarged condition of a structure of the stepping motor 1 is shown in FIG. 2. The structure in which an outer portion is partially cut away in order to show the inside is shown in the drawing in FIG. 2. The stepping motor 1 is provided with a stator 2. The stator 2 is provided with stators 2a and 2b that have two phases and are axially adjoined. The structures of stators 2a and 2b are the same.

The stator 2a is selectively explained hereinafter. The stator 2a has a structure in which an inner yoke 4 is arranged axially in a cup-shaped outer yoke 3 and is connected thereto, and a coil 5a, which operates as a stator coil, is disposed within the cup-shaped outer yoke 3.

The outer yoke 3 has a cup shape that is open toward an axially one-way direction. That is, as shown in FIG. 2, the outer yoke 3 is provided with a bottom surface portion 3a having an annular shape and an outer cylindrical portion 3b which is initiated and perpendicularly extended from an outer circumferential edge of the bottom surface portion 3a toward the axial direction. Furthermore, the outer yoke 3 is provided with plural pole teeth 3c perpendicularly protruding from an inner circumferential edge of the bottom surface 3a toward the axial direction. In this structure, the outer cylindrical portion 3b composes the outer circumferential portion of the outer yoke 3, and the plural pole teeth 3c compose the inner circumferential portion of the outer yoke 3. The outer yoke 3 has a structure in which a clearance formed between the inner and outer circumferential portions is open toward the axial direction. The open clearance is closed by an annular end surface portion 4a described below in the inner yoke 4 when assembling of the stator 2a is completed.

The inner yoke 4 is provided with the annular end surface portion 4a and plural pole teeth 4b protruding from an inner circumferential edge of the end surface portion 4a toward the axial direction. In this structure, the plural pole teeth 4b compose the inner circumferential portion of the inner yoke 4. The pole teeth 3c and the pole teeth 4b protrude toward mutually inverse directions and are engaging with each other via gaps. Furthermore, the pole teeth 3c and the pole teeth 4b form a gap with a rotor 6 described below.

The outer yoke 3 and the inner yoke 4 are fixed at a portion of reference symbol "S" in FIG. 2, whereby a positional relationship of both yokes is determined. That is, the outer circumferential edge (the outside edge portion) of the inner yoke 4 is fixed to the inner circumferential surface of the outer cylindrical portion 3b of the outer yoke 3. The axial position of an opening end portion 3d (the edge portion) axially protrudes beyond the fixed portion of the outer yoke 3 and the outer yoke 4. The structure of the stator 2b is the same as the structure of the stator 2a.

The rotor 6 having a columnar shape is disposed inside of the stator 2 via the gap and is rotatable with respect to the stator 2. The rotor 6 is provided with a multiply magnetized magnet 7 on the outer circumferential surface thereof and a shaft 8. The shaft 8 is rotatably held by a bearing (not shown). The rotor 6 is positioned with respect to the stator 2 so that the outer circumferential surface of the magnet 7 can face the pole teeth 3c and the pole teeth 4b via the gap.

When an electric current for driving the motor is conducted to the coil 5a, the outer yoke 3 and the inner yoke 4 function as a magnetic circuit, so that a magnetic circuit is formed by a leakage magnetic flux in the gap by which the pole teeth 3c and the pole teeth 4b are engaging with each other. The magnetic circuit formed by the leakage magnetic flux includes a component having a power toward the circumferential direction on a circle that is coaxial with the shaft 8, and the component causes a magnetic interaction with the magnet 7 having plural magnetic poles on the outer circumferential surface thereof, whereby a torque for rotating the magnet 7 is generated. Furthermore, the torque for rotating the magnet 7 is continually generated by inversing polarity of the electric current for driving conducted to the coil 5a, so that the magnet 7 rotates with respect to the stator 2a. The condition in the stator 2b is the same as the above.

Figure 3A:
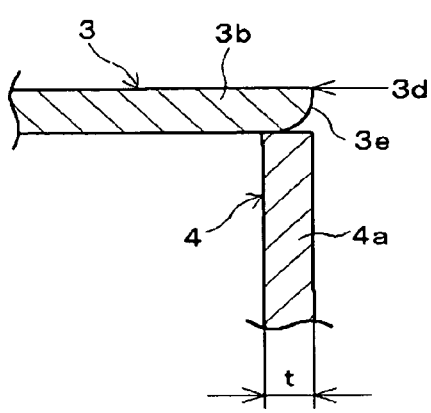
FIG. 3A is a partial cross-sectional view showing a fixing structure applied with the conventional method.
Figure 3B:
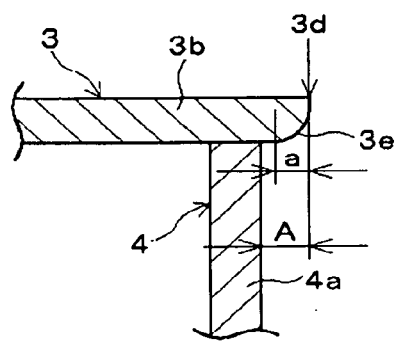
FIG. 3B is a partial cross-sectional view showing the fixing structure of the present embodiment.

The structure of the fixed portion of the outer yoke 3 and the inner yoke 4 in the portion of reference symbol "S" shown in FIG. 2 is explained hereinafter. FIGS. 3A and 3B are partially cross-sectional views showing the fixed portion S in FIG. 2. In FIG. 3A, the thickness of the end surface portion 4a of the inner yoke 4 is defined as "t". In FIG. 3B, the axial distance from the opening end portion 3d of the outer yoke 3 to the fixed portion of the inner yoke 4 with respect to the outer yoke 3 is defined as "A". The axial width of a round portion 3e (the axial distance of the round portion 3e from the opening end portion 3d of the outer yoke 3 over the round portion 3e) is defined as "a".

The structure using the conventional method for fixing is shown in FIG. 3A, and the round portion 3e by bending, is not considered in this structure. In this fixing method, the round portion 3e is formed in processing with respect to the outer yoke 3 from the opening end portion 3d to the inside portion. The inner yoke 4 is fixed to the outer yoke 3 at the round portion 3e formed by bending.

In this fixing structure, controlling the shape of the round portion 3e is difficult in a production step of the outer yoke 3, so that the contact area of the outer yoke 3 and the inner yoke 4 in the stator 2a (see FIGS. 1 and 2) is uneven according to the condition (difference in shape) of the round portion 3e. The magnetic circuit for the magnetic flux generated by the coil 5a is formed in the contacting portion, so that the unevenness in the contact area causes unevenness of magnetic resistance in the stator 2. As a result, performances of the claw-pole-type stepping motors are uneven.

In the structure shown in FIG. 3B, the outer circumference of the inner yoke 4 is fixed to the inner circumference of the outer yoke 3 under the condition "A>a" in which the axial width "a" of the round portion 3e on the inner circumference of the outer yoke 3 is considered. In this case, the position in the axial direction (the horizontal direction in FIGS. 3A and 3B) of the opening end portion 3d (the edge portion) of the outer cylindrical portion 3b is axially outside (the right-hand in FIGS. 3A and 3B) with the distance "A" from the fixed portion of the outer yoke 3 and the inner yoke 4. Furthermore, the distance "A" is greater than the width "a", so that the outer yoke 3 and the inner yoke 4 contact each other at the position maintaining a distance from the round portion 3e (the position avoiding the round portion 3e). The position is on the inner circumferential surface of the outer cylindrical portion 3b and is linearly extended toward the axial direction, as shown in FIG. 3B, whereby the stable contacting can be performed. In this condition, the structure in which the contact area of the outer yoke 3 and the inner yoke 4 is not affected by the condition (the shape) of the round portion 3e can be obtained.

Figure 4:
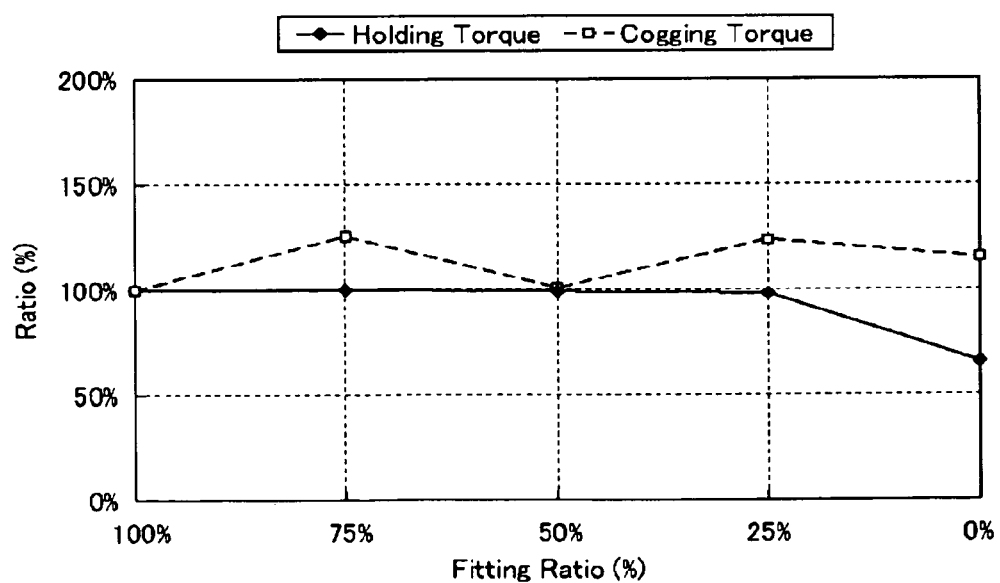
FIG. 4 is a graph showing a relationship between fitting ratio (%) of a plate thickness of an inner yoke in closely fitting and holding torque and cogging torque ratios (%).
Figure 5A:
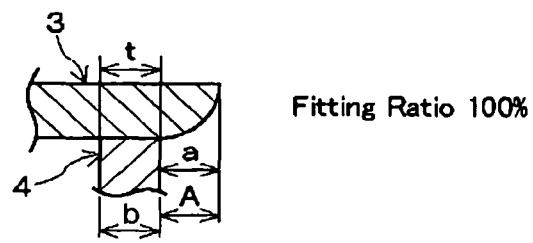
FIGS. 5A to 5E are cross-sectional views showing the fitting structures.
Figure 5B:
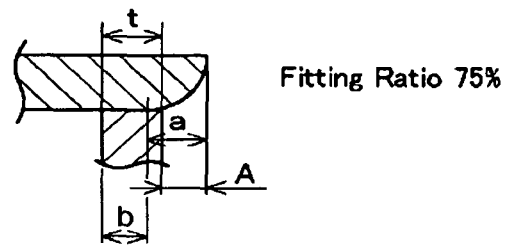
Figure 5C:
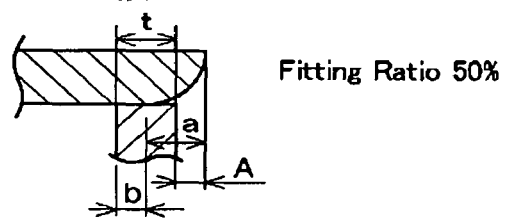
Figure 5D:
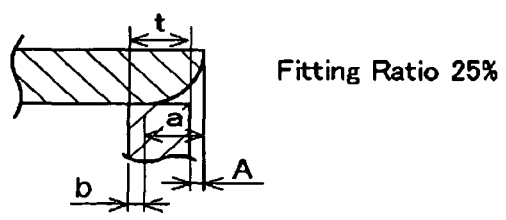
Figure 5E:
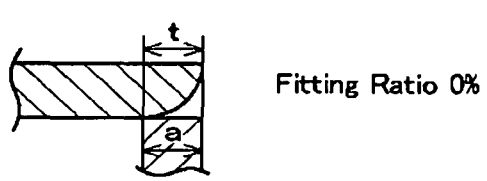

In FIG. 4, a fitting ratio (%) is plotted on the horizontal axis and indicates the ratio (in percent of the contact length b of the outer yoke 3 and the inner yoke 4 to the thickness "t" of the inner yoke 4. Holding torque and cogging torque ratios (%) based on a case in which the value of the fitting ratio (%), which is percentage of the outer yoke 3 with respect to the thickness "t" of the inner yoke 4 is 100% are applied on the vertical axis. The fixing structures of the yokes are shown in FIGS. 5A to 5E when each value on the horizontal axis is varied as 100%, 75%, 50%, 25%, and 0%. As shown in FIG. 4, the cogging torque ratio corresponding to the decrease in the ratio of contact length "b" to the thickness "t" of the inner yoke 4, and the holding torque ratio decreases as the percentage of coverage has a value of 25% or less. Thus, the contact area of the inner yoke 4 and the outer yoke 3 is small according to increase of the ratio of the overlapping portion of the round portion 3e with respect to the thickness "t" of the inner yoke 4, so that the performance of the motor is varied.

Figure 6:
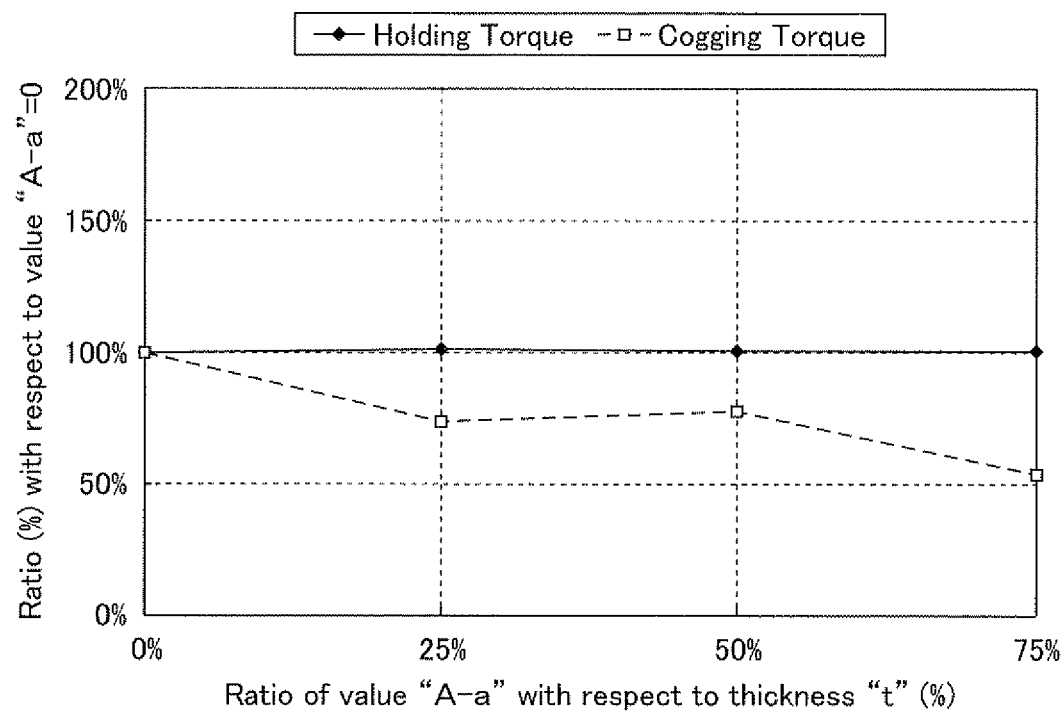
FIG. 6 is a graph showing relationships between a fixing condition of the yokes and the holding torque and the cogging torque ratios (%).
Figure 7A:
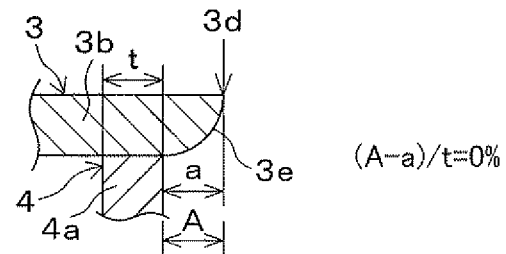
FIGS. 7A to 7E are cross-sectional views showing the fixing structures of the present embodiment.
Figure 7B:
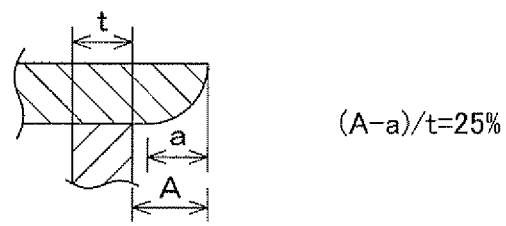
Figure 7C:
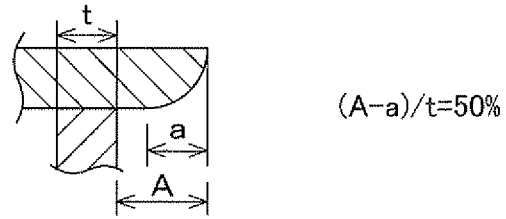
Figure 7D:
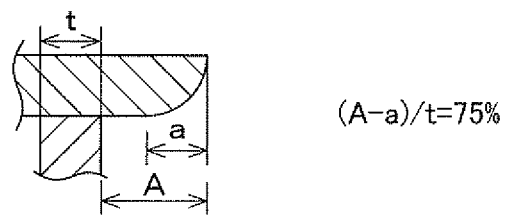
Figure 7E:
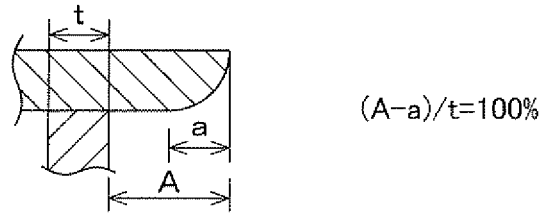

In FIG. 6, the ratio (%) which is a percentage of the difference between the inner dimension initiated from the axially opening end portion 3d, defined as "A" and the axial length of the round portion 3e, defined as "a", (that is, the value "A−a") with respect to the thickness "t" is applied on the horizontal axis. Furthermore, the holding torque and the cogging torque ratios (%) based on a case (100%) in which the difference between the inner dimension "A" from the axially opening end portion 3d and the axial length of the round portion 3e "a" (the value "A−a") is zero are applied on the vertical axis in FIG. 6. The structures are shown in FIGS. 7A to 7E when each value on the horizontal axis in FIG. 6 is varied as 0%, 25%, 50%, 75%, and 100%. As shown in FIG. 6, the holding torque is stable as the overlapping portion of the inner yoke 4 and the outer yoke 3 is remote from the round portion 3e. The cogging torque ratio is decreased when the ratio calculated by the formula (A−a)/t is zero or more. That is, when the value "A" is equal to or greater than the value "a", characteristics of the motor can be improved and are stable. The position "A" of the inner yoke 4 may be arbitrarily determined according to the length of the motor.

The present invention is not limited to the above embodiment and includes variations obvious to those skilled in the art, and effects of the invention are not restricted by the above embodiment. That is, various additions, modifications, and partial omissions are possible within the scope of the concept and the objects of the invention, as claimed and equivalents thereof.

What is claimed is:

1. A claw-pole-type stepping motor comprising:
   a stator annularly disposed therein and having a coil;
   a rotor rotatably disposed inside the stator and having a multiply magnetized permanent magnet and a shaft;
   an outer yoke provided in the stator and having a cup shape opening toward an axially outside direction;
   an outer circumferential portion provided in the outer yoke and having a cylindrical shape and an inner circumferential portion including first pole teeth;
   an inner yoke provided in the stator and having second pole teeth provided in an inner circumference thereof and an outer circumferential portion fixed to an inner circumferential surface of the outer circumferential portion of the outer yoke;
   wherein the first pole teeth and the second pole teeth are engaging with each other via a gap in an axial direction and are disposed with respect to the permanent magnet of the rotor via a gap, fixed portion of the inner yoke and the outer yoke is positioned at the axial inside of an opening end of the cup shape of the outer yoke, the opening end protrudes beyond the fixed portion toward the axially outer direction, a round portion is formed at an inner side of the opening end of the cup shape, and the fixed portion is positioned at a position including the portion except for the round portion.

2. A stepping motor according to claim 1, wherein the fixed portion is positioned at the position avoiding the round portion.

3. A stepping motor according to claim 2, wherein an axial length of the round portion initiated from the opening end of the cup shape is defined as "a", an axial length from the opening end of the cup shape to the fixed position is defined as "A", and the reference symbols "a" and "A" satisfy the formula A≧a.

* * * * *